(12) United States Patent
Xue et al.

(10) Patent No.: US 10,991,374 B2
(45) Date of Patent: Apr. 27, 2021

(54) REQUEST-RESPONSE PROCEDURE BASED VOICE CONTROL METHOD, VOICE CONTROL DEVICE AND COMPUTER READABLE STORAGE MEDIUM

(71) Applicant: BOE TECHNOLOGY GROUP CO., LTD., Beijing (CN)

(72) Inventors: Ruibin Xue, Beijing (CN); Xin Li, Beijing (CN); Shuai Yang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 194 days.

(21) Appl. No.: 16/178,501

(22) Filed: Nov. 1, 2018

(65) Prior Publication Data
US 2019/0304466 A1    Oct. 3, 2019

(30) Foreign Application Priority Data
Mar. 30, 2018    (CN) .......................... 201810289149.4

(51) Int. Cl.
G10L 15/22        (2006.01)
G10L 17/00        (2013.01)
G10L 17/06        (2013.01)
G10L 25/63        (2013.01)

(52) U.S. Cl.
CPC .............. *G10L 17/00* (2013.01); *G10L 15/22* (2013.01); *G10L 17/06* (2013.01); *G10L 25/63* (2013.01)

(58) Field of Classification Search
CPC .... G10L 15/22; G10L 2015/223; G06F 3/167
See application file for complete search history.

(56) References Cited

U.S. PATENT DOCUMENTS

| 5,855,000 | A * | 12/1998 | Waibel ..................... G06K 9/03 704/235 |
| 9,147,054 | B1* | 9/2015 | Beal ........................ G06F 21/32 |
| 9,875,740 | B1* | 1/2018 | Kumar .................... G10L 25/51 |
| 2014/0201122 | A1 | 7/2014 | Park |
| 2016/0027436 | A1* | 1/2016 | Lee ......................... G10L 15/08 704/236 |
| 2018/0211662 | A1* | 7/2018 | Yamaguchi ............... G06F 3/16 |

FOREIGN PATENT DOCUMENTS

| CN | 106251863 A | 12/2016 |
| CN | 106683673 A | 5/2017 |
| CN | 107199971 A | 9/2017 |
| CN | 107305483 A | 10/2017 |

OTHER PUBLICATIONS

First Chinese Office Action dated Apr. 3, 2020, for corresponding Chinese Application No. 201810289149.4, 14 pages.

* cited by examiner

*Primary Examiner* — Jialong He
(74) *Attorney, Agent, or Firm* — Kinney & Lange, P.A.

(57) ABSTRACT

A voice control method, a voice control device, a computer readable storage medium, and a computer device are disclosed. The voice control method comprises: receiving, in an instruction receiving state, a voice instruction of a user for a specific operation; performing voice processing on the voice instruction to obtain voice information; transmitting, to the user, a request to confirm the voice information; receiving, from the user, a response to the request; and performing the specific operation if the response confirms that the voice information is correct.

16 Claims, 5 Drawing Sheets

REQUEST-RESPONSE PROCEDURE BASED VOICE CONTROL METHOD, VOICE CONTROL DEVICE AND COMPUTER READABLE STORAGE MEDIUM

CROSS REFERENCE TO RELATED APPLICATION

The present application claims priority of Chinese Patent Application No. 201810289149.4, entitled "Voice Control Method, Voice Control Device, Computer Readable Storage Medium, and Computer Device," and filed on Mar. 30, 2018, which is incorporated herein entirely by reference.

TECHNICAL FIELD

The present disclosure relates to voice control technology, and more particularly, to a voice control method, a voice control device, a computer readable storage medium, and a computer device.

BACKGROUND

Usually, an electronic device using conventional voice control technology operates directly according to the semantics of voice processing of a voice instruction received from a user. However, in the case where the user's voice instruction is not standard, it is likely to cause a voice control system to operate erroneously. For example, a non-standard pronunciation by the user may cause a voice navigation device to determine a navigation destination as a wrong location. Then, it is troublesome for the user to return back to the previous state by voice, and it will waste the efforts made by the voice control operations which had been performed before the wrong voice control occurs.

SUMMARY

The embodiments of the present disclosure provide a voice control method, a voice control device, a computer readable storage medium, and a computer device.

In an aspect of the present disclosure, a voice control method is provided, comprising: receiving, in an instruction receiving state, a voice instruction of a user for a specific operation; performing voice processing on the voice instruction to obtain voice information; transmitting, to the user, a request to confirm the voice information; receiving, from the user, a response to the request; and performing the specific operation if the response confirms that the voice information is correct.

In an embodiment, the voice control method is used in a method for voice navigation.

In an embodiment, the method further comprises entering into the instruction receiving state to receive another voice instruction of the user for the specific operation, if the response confirms that the voice information is incorrect.

In an embodiment, the request and the response are implemented by means of voice.

In an embodiment, the method further comprises taking the response as another voice instruction for the specific operation if the response does not confirm that the voice information is correct.

In an embodiment, the method further comprises acquiring voiceprint information of the voice instruction to determine an identity of the user.

In an embodiment, the step of performing voice processing on the voice instruction to obtain voice information further comprises: determining a user-specific instruction set based upon the identity of the user; and performing voice processing on the voice instruction based on the user-specific instruction set.

In an embodiment, the method further comprises determining a loudness level of the voice instruction; and determining an emotional state of the user based on the determined loudness level.

In an embodiment, the method further comprises determining a reference loudness level for the user based on the identity of the user; and determining an emotional state of the user by comparing the determined loudness level to the reference loudness level.

In an embodiment, the method further comprises determining a user habit model based on the identity of the user; performing a behavior analysis based upon the voice information using the user habit model; and providing the user with feedback information based on the result of the behavior analysis.

In an embodiment, the method further comprises determining a user habit model based on the identity of the user; performing a behavior analysis initiatively using the user habit model; and providing the user with push information based on the result of the behavior analysis.

In an embodiment, the method further comprises acquiring external information, wherein the external information includes time information, location information, or speed information. The step of performing the behavior analysis further comprises performing the behavior analysis based on the external information.

In an embodiment, the user habit model is stored, trained, and/or updated by a cloud server.

In an embodiment, the method further comprises determining, based upon the determined voice information, whether the voice instruction matches a voice instruction for another operation; and if they are matched, performing the another operation instead of the specific operation.

In another aspect of the present disclosure, a voice control device is provided, comprising: a sound receiving unit configured to receive a voice instruction of a user for a specific operation; a voice transmitting unit configured to transmit a voice to the user; a storage having stored thereon computer programs; and a processor. The processor is configured to execute the computer programs to: perform voice processing on the received voice instruction to obtain voice information; transmit, to the user, a request to confirm the voice information; receive, from the user, a response to the request; and perform the specific operation if the response confirms that the voice information is correct.

In an embodiment, the voice control device includes a device for voice navigation.

In an embodiment, the processor is further configured to execute the computer programs to enter into the instruction receiving state to receive another voice instruction of the user for the specific operation, if the response confirms that the voice information is incorrect.

In an embodiment, the request and the response are implemented by means of the sound receiving unit and the sound transmitting unit, respectively.

In an embodiment, the processor is further configured to execute the computer programs to take the response as another voice instruction for the specific operation, if the response does not confirm that the voice information is correct.

In an embodiment, the processor is further configured to execute the computer programs to acquire voiceprint information of the voice instruction to determine an identity of the user.

In an embodiment, the processor is further configured to execute the computer programs to determine a user-specific instruction set based upon the identity of the user and perform voice processing on the voice instruction based on the user-specific instruction set.

In an embodiment, the processor is further configured to execute the computer programs to determine a loudness level of the voice instruction and determine an emotional state of the user based on the determined loudness level.

In an embodiment, the processor is further configured to execute the computer programs to determine a reference loudness level for the user based on the identity of the user, and determine an emotional state of the user by comparing the determined loudness level to the reference loudness level.

In an embodiment, the processor is further configured to execute the computer programs to determine a user habit model based on the identity of the user, perform a behavior analysis based upon the voice information using the user habit model, and provide the user with feedback information based on the result of the behavior analysis.

In an embodiment, the processor is further configured to execute the computer programs to determine a user habit model based on the identity of the user, perform a behavior analysis initiatively using the user habit model, and provide the user with push information based on the result of the behavior analysis.

In an embodiment, the voice control device is further configured to acquire external information. The external information includes time information, location information, or speed information. The processor is further configured to execute the computer programs to perform the behavior analysis based on the external information.

In an embodiment, the user habit model is stored, trained, and/or updated in a cloud server.

In an embodiment, the processor is further configured to execute the computer programs to: determine, based upon the determined voice information, whether the voice instruction matches a voice instruction for another operation; and if they are matched, performing the other operation instead of the specific operation.

In yet another aspect of the present disclosure, a computer readable storage medium is provided. The computer readable storage medium has stored thereon executable instructions which, when executed by a processor, cause the processor to carry out the method according to at least one of the aforesaid embodiments of the present disclosure.

In a further aspect of the present disclosure, a computer device is provided. The computer device comprises a storage, a processor, and a computer program stored on the storage and executable by the processor. The computer program, when executed by the processor, causes the processor to carry out the method according to at least one of the aforesaid embodiments of the present disclosure.

DETAILED DESCRIPTION

In the following, the embodiments of the present disclosure will be described in detail. It should be noted that the following embodiments are illustrative and explanatory only, rather than limiting the scope of the present disclosure. In the following, numerous specific details are set forth in order to provide a sufficient understanding of the present disclosure. However, it will be apparent to those skilled in the art that the present disclosure is not limited to the specific details. In other instances, well-known circuits, materials, or methods have not been described in detail in order to avoid obscuring the present disclosure.

References to "one embodiment", "an embodiment", "one example" or "an example" mean that particular features, structures, or characteristics described in connection with the embodiments or examples are included in at least one embodiment of the present disclosure. Thus, the phrases "in one embodiment", "in an embodiment", "one example", or "an example" used throughout the description do not necessarily refer to one and the same embodiment or example. Furthermore, particular features, structures, or characteristics may be combined in one or more embodiments or examples in any suitable combination and/or sub-combination. In addition, one of ordinary skill in the art can understand that the drawings are provided for the purpose of illustration and are not necessarily drawn to scale. The term "and/or" used herein includes any and all combinations of one or more of associated listed items.

It should be understood that the voice control device and the voice control method according to the present disclosure can be applied to various scenarios capable of performing human-machine voice interaction, such as home appliance control, industrial machine operation, vehicle driving, voice navigation, etc. The present disclosure is not limited thereto.

For convenience of understanding, detailed description of embodiments of the present disclosure will be provided by taking a scenario of voice navigation as an example. However, it should be understood that the present disclosure is equally applicable to the other scenarios mentioned above.

It should be understood that the voice control device according to the present disclosure may be a stand-alone electronic device, or may be an integrated module integrated into another host system (such as an in-vehicle electronic system), and the disclosure is not limited thereto. Furthermore, the voice control function of the voice control device according to the present disclosure may be implemented by hardware or software or a combination of both, for example, the voice control device may implement the voice control function by an application installed thereon.

The present disclosure is described in detail below with reference to the accompanying drawings.

Figure 1:
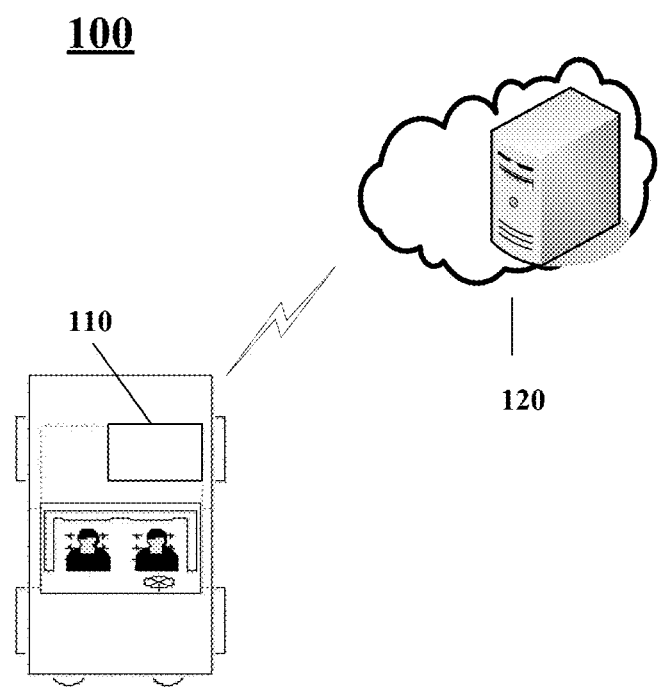
FIG. 1 is a schematic diagram illustrating an exemplary voice navigation control scenario according to an embodiment of the present disclosure.

FIG. 1 is a schematic diagram illustrating an exemplary voice navigation control scenario 100 according to an embodiment of the present disclosure.

As shown in FIG. 1, a voice navigation device 110 and a cloud server 120, which can communicate wirelessly, are involved in the voice navigation control scenario.

The voice navigation device 110 may be an electronic device (e.g., a mobile communication device having a voice navigation function, such as a mobile phone, etc.) that can independently implement voice navigation or a navigation module integrated in the in-vehicle electronic system. The voice navigation device 110 is capable of voice interaction with a user and is capable of implementing route navigation desired by the user according to the voice indication of the user.

The cloud server 120 can be a local or remote server implemented by any server configuration that enables processing (such as receiving/transmitting, computing, storing, training, etc.) of data from the vehicle. The wireless communication between the cloud server 120 and the vehicle can be implemented by various means such as cellular communication (such as 2G, 3G, 4G or 5G mobile communication technology), WiFi, satellite communication, etc. Although the cloud server 120 and voice navigation device 110 are shown as communicating directly in FIG. 1, it should be understood that they may communicate indirectly with each other in other embodiments of the present disclosure.

Figure 2:
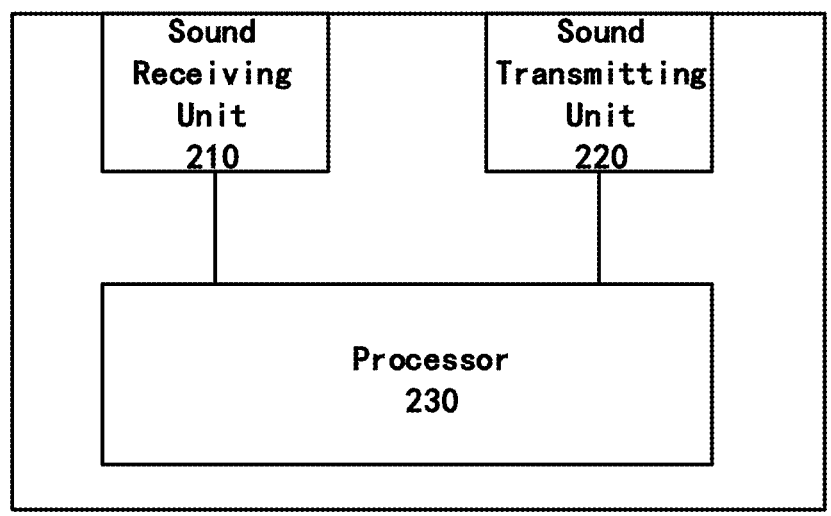
FIG. 2 is an exemplary block diagram showing the voice navigation device of FIG. 1.

FIG. 2 is an exemplary block diagram showing the voice navigation device 110 of FIG. 1.

As shown in FIG. 2, the voice navigation device 110 includes sound receiving unit 210, sound transmitting unit 220, and a processor 230.

The sound receiving unit 210 is configured to receive a voice uttered by a user, which may be implemented as a microphone or other device capable of collecting a sound signal and converting it into an electrical signal. In an embodiment of the present disclosure, the sound receiving unit 210 is capable of receiving a user's voice instruction for a specific operation.

The sound transmitting unit 220 is configured to emit a sound to be received by the user, such as a prompt sound, a voice call, music, and the like. The sound transmitting unit 220 may be a speaker or any other device capable of converting an electrical signal into a sound signal.

The processor 230 is configured to process the generated electrical signal and control the voice navigation device 110 to operate according to the result of the processing.

Figure 3:
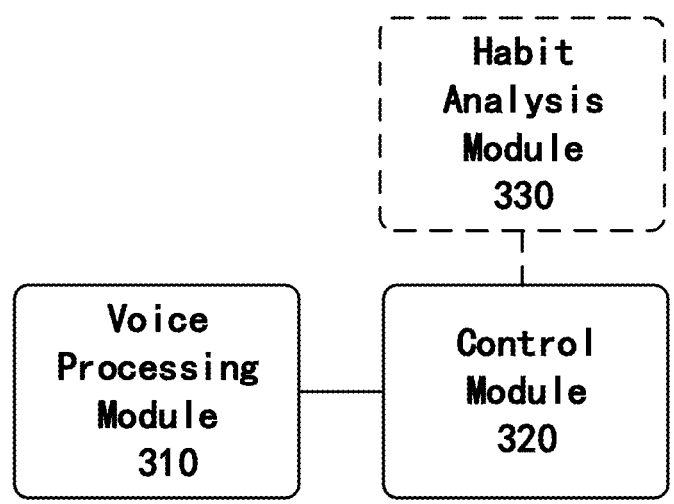
FIG. 3 is an exemplary block diagram showing a processor of FIG. 2.

FIG. 3 is an exemplary block diagram showing the processor 230 of FIG. 2.

As shown in FIG. 3, the processor 230 includes a voice processing module 310, a control module 320, and a habit analysis module 330. The habit analysis module 330 is shown by a dashed box, indicating that this module is not necessary in an embodiment of the present disclosure. As for modules shown in solid lines, one or more of them can be omitted or incorporated or other processing modules may be added depending on the processing performed, in other embodiments.

It should be noted that in FIGS. 2 and 3, the voice navigation device 110 is illustrated as including a single processor having a plurality of functional modules, but the present disclosure is not limited thereto. In other embodiments, the voice navigation device 110 can implement different functions separately through multiple processors. In other embodiments, the voice navigation device 110 may implement some of the functions through interaction with external functional devices.

The voice processing module 310 is configured to perform voice processing on the voice instruction of the user to obtain voice information. In one embodiment, the voice processing module 310 can extract acoustic features from the received voice instructions, compare the extracted acoustic features with features of respective instructions in a user-specific instruction set, and determine the user's voice instruction based on the comparison result. For example, the voice processing module 310 may store an instruction set including common voice instructions in association with their corresponding voice information. When it is determined by matching that the voice instruction of the user corresponds to an instruction in the instruction set, the relevant voice information for the corresponding instruction is determined as the voice information of the received voice instruction of the user. In one embodiment, the voice processing module 310 can include a database and store different specific set of instructions for different users in the database.

In case that there are different specific sets of instructions for multiple users in the voice processing module 310, the set of instruction to be used in matching needs to be selected from the plurality of different sets of instructions prior to voice processing. In order to achieve this, in an embodiment, the voice processing module 310 is further configured to determine voiceprint information from the voice instruction, determine a user identity according to the voiceprint information, and select a specific instruction set, which corresponds to the determined user identity, as the instruction set to be used in matching. It should be understood that, with constant interaction with the user, the voice processing module 310 can continuously add new instructions to the instruction set (that is, update the instruction set) based on correspondence between the user's voice instruction and the subsequently performed operation (the user can confirm the correspondence by inputting texts or clicking the display interface when it is used the first time).

In the above embodiment, if the voice processing module 310 confirms that the user is a new user based on the determined voiceprint information, the voice processing module 310 uses the default set of instructions as the specific set of instructions for the user. In subsequent use, the speech processing module 310 accumulates the default set of instructions by communicating with the user and thereby updates the default set of instructions so as to form the specific set of instructions for the user.

In one embodiment, the voice processing module 310 is further configured to determine a loudness level from the voice instruction. For example, the loudness level can be specified as several levels, such as strong, medium, weak, and the like. The voice processing module 310 can determine emotional state of the user based on the determined loudness level. For example, when the voice processing module 310 determines that the loudness level is strong, it can determine that the user is in a state of excitement or anger. In this case, the voice processing module 310 can transmit the result to the control module 320 which controls the voice navigation device 110 to play relaxed music or a voice to raise attention to safety.

In one embodiment, a reference loudness level indicating the user's regular voice soundness may be stored in the voice processing module 310, and may be used, after determining the user identity by voiceprint recognition or other means, as an object with which the loudness level determined from the voice instruction is compared when determining the emotional state of the user.

The control module 320 is configured to cause the voice navigation device 110 to operate. In an embodiment of the present disclosure, the control module 320 may control the voice navigation device 110 to transmit to the user a request to confirm the voice information after receiving the voice instruction of the user and identifying the voice information for the voice instruction, receive a response to the request, and perform the specific operation if the response confirms that the voice information is correct. In addition, the control module 320 is further configured to perform control to cause the voice control device to enter into an instruction receiving state to receive another voice instruction of the user for the specific operation, if the response confirms that the voice information is incorrect.

In one embodiment, if the voice navigation device 110 has not received the response from the user for a long time, the control module 320 considers that the user confirms the correctness of the voice information and controls the voice navigation device 110 to start route navigation according to the confirmed voice information. In another embodiment, if the voice navigation device 110 has not received the response from the user for a long time, the control module 320 continues to wait until the response from the user is received.

In the above embodiment, the control module 320 is capable of controlling such that the voice navigation device 110 transmits a request to confirm voice information to the user, and receives a response to the request from the user. Through the request and the response, the user can correct the error of the device in time before the voice navigation device 110 misidentifies the user's voice instruction and performs a wrong operation, so as to avoid that the efforts made by the operations which had been performed previously are wasted due to the wrong operation. (For example, the user may reach the current interface (e.g., an interface for inputting a destination) through multiple voice interactions).

The control module 320 may perform the process involving the request to confirm voice information and the response every time after receiving the voice instruction from the user, or may perform the process only at a specific stage of voice navigation or upon receiving a specific voice instruction.

In one embodiment, the request and the response are implemented by the sound receiving unit 210 and the sound transmitting unit 220, respectively. In other embodiments, the request and the response may be implemented by input and output devices such as a display screen, a keyboard, and the like.

In the case that the request and the response are implemented by the sound receiving unit 210 and the sound transmitting unit 220, when the voice response does not confirm that the voice information is correct, the voice response can be provided to the voice processing module 310 as another voice instruction for the specific operation. In this embodiment, when the user determines that the voice navigation device 110 has misidentified the user's voice instruction, it is not necessary for the user to provide the voice navigation device 110 with information such as "wrong identification"; instead, the user provides the correct voice instruction again. (For example, it can be done at a slower speed of voice or a more standard pronunciation so as to improve the possibility of correct identification of the device.)

Moreover, at this stage of voice navigation, even if the voice navigation device 110 is waiting for a voice instruction for specific operation from the user, a specific voice instruction can be assigned to other operational functions. When receiving this specific voice instruction, the voice navigation device 110 does not consider it as a voice instruction for the specific operation, but rather considers it as an instruction for the other operational functions. That is, the voice navigation device 110 may determine, according to the determined voice information, whether the received voice instruction matches the voice instruction for the other operations, and if they are matched, perform the other operations instead of the specific operation according to the processed voice information.

For example, while waiting for a voice instruction from a user for an operation of setting a destination, the user can give a voice instruction of "go back to the previous page". The voice navigation device 110 can assign the voice instruction of "go back to the previous page" received at this stage to the display interface operation function of the device 110 in advance, and cause the display interface to display the previous page according to the voice information obtained by processing of the voice instruction.

The habit analysis module 330 is configured to collect and store user habit data, and analyze and process the habit data. The habit data may include songs that the user likes, the user's favorite broadcast channels, places to which the user frequently goes, customary in-vehicle temperatures, customary routes between two points, and the like. The habit data may include a plurality of recording parameters, such as the time and place at which the habit data generates and the like.

In one embodiment, the habit analysis module 330 performs, upon receiving a specific voice instruction of the user, a behavior analysis based on the voice information determined from the voice instruction as described above, and provides the user with feedback information based on the result of analysis.

In another embodiment, the habit analysis module 330 may also initiatively perform a behavior analysis and provide the user with push information when generating a specific user operation, entering a specific vehicle state, or meeting other specific conditions (e.g., time conditions or location conditions).

In one embodiment, the voice navigation device 110 is further configured to obtain external information, wherein the external information includes time information, location information, or speed information. In this case, the habit analysis module 330 also performs a behavior analysis based on the external information.

To implement a behavior analysis, the habit analysis module 330 can create a user habit model and perform the above behavior analysis based on the user habit model. Then, it may generate feedback information or push information to be provided to the user based on the result of the behavior analysis.

The habit analysis module 330 can train the corresponding habit model using training parameters based on machine learning (using random forest algorithm, SVM, Adaboost algorithm, etc.) or deep learning (using CNN, LSTM, etc.). Taking the navigation scenario as an example, the training parameters may be departure time, departure location, destination, and behavior purpose (such as going home, going to work, picking up a child, going to the gym, etc.), and the like. In one embodiment, the habit model may be stored in the form of a lookup table.

For example, in a navigation scenario, if it is detected that the user uses the system at a certain time and location (for example, the user has issued a voice instruction or caused the vehicle system to enter a specific state (such as starting up the car)) when using a trained habit model, the habit analysis module 330 is triggered or actively inputs information about the time, departure location into the habit model, and gives recommendations about the navigation destination through the habit model (e.g., by traversing the lookup table). For example, when the time is 7:00 am and the departure location is a residential area A, the output of the habit model is "go to work", and the habit analysis module 330 provides the result of "go to work" to the user by voice or display.

For another example, the control module 320 can also control the habit analysis module 330 to make a recommendation about a parking lot when the navigation is about to finish. Again, this operation may be based on a voice request or may be initiated by the control module 320 after a certain condition is met (e.g., 1 km from the destination).

Returning back to FIG. 1, the cloud server 120 of FIG. 1 will be further described.

A cloud habit analysis module may be included in the cloud server 120. In the voice navigation device 110, data of the habit analysis module 330 (for example, a habit model) may be stored and sent to the cloud server 120 so that it may be used by the cloud habit analysis module. The cloud habit analysis module can also store the data (for example, a habit model).

The cloud habit analysis module can train the stored habit model and send the trained habit model back to the voice navigation device 110 to update it.

In one embodiment, the cloud habit analysis module may store data of a plurality of different voice navigation terminals and update each habit model by performing comparative analysis on the data.

In one embodiment, the function of the habit analysis module 330 in the voice navigation device 110 can be transferred to the cloud server 120, and the function is implemented by the cloud habit analysis module instead of the habit analysis module 330. For example, the habit model may be created in the cloud server 120 by the cloud habit analysis module.

Figure 4:
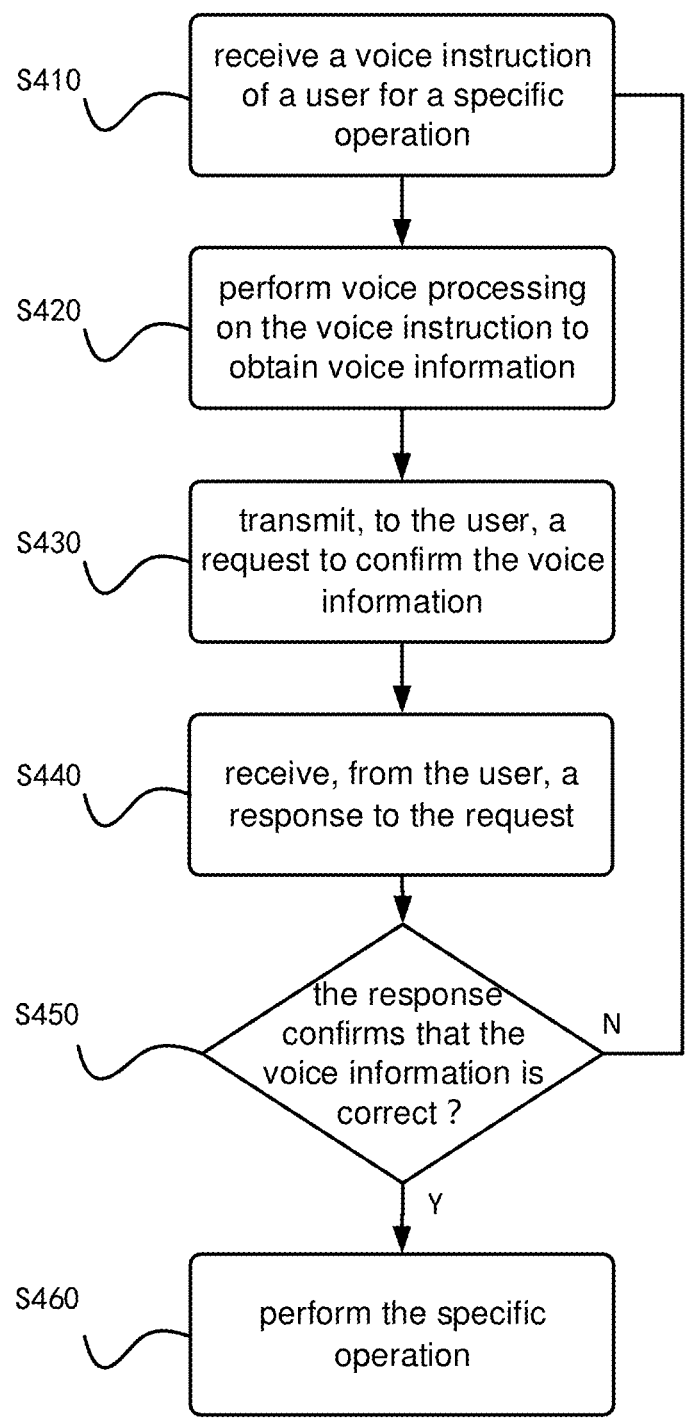
FIG. 4 is a flowchart illustrating a voice navigation method according to an embodiment of the present disclosure.

FIG. 4 is a flowchart illustrating a voice navigation method 400 according to an embodiment of the present disclosure. The voice navigation method 400 can be performed by a voice navigation device (such as the voice navigation device 110 shown in FIG. 1). Therefore, the contents of the above detailed description in conjunction with FIGS. 1 to 3 are equally applicable to the following description of the flowchart of FIG. 4, and the similar content will not be repeated.

In step S410, a voice instruction of a user for a specific operation is received in the instruction receiving state.

For example, the voice instruction may be a voice of "the destination is Shaanxi hotel."

In step S420, the voice instruction is subjected to voice processing to obtain voice information.

In the above example, after receiving the voice of "the destination is Shaanxi Hotel", the voice information can be obtained by voice processing. Due to the user's accent and the like, the obtained voice information may be interpreted as "the destination is Shanxi Hotel".

In step S430, a request to confirm voice information is transmitted to the user. According to the above example, the voice navigation device transmits the request to the user (for example, a voice-based request) so as to request the user to confirm "Are you going to the Shanxi Hotel?"

In step S440, a response to the request is received from the user.

In the above example, after receiving the request to confirm "Are you going to the Shanxi Hotel?", the user can determine whether the result of voice processing of the voice navigation device is correct or not, and send back the corresponding response. For example, when it is found that the voice navigation device does not recognize the "Shaanxi Hotel" the user wants to go, the user can respond by a voice response "No".

In step S450, it is determined whether the response confirms that the voice information is correct or that the voice information is incorrect.

The voice navigation device receives the user's voice response "No" and determines whether the user confirms that the voice information is correct. In general, a plurality of voice instructions may be set to correspond to an instruction which confirms that the voice information is correct, and all other voice instructions are considered to be an instruction which confirms that the voice information is incorrect.

In step S460, the specific operation is performed if the response confirms that the voice information is correct.

Further, if the response confirms that the voice information is incorrect, the instruction receiving state is entered to receive another voice instruction of the user for the specific operation (i.e., returning to step S410).

In the above example, the voice navigation device confirms that the user has given a negative response, thereby entering into the instruction receiving state to receive another voice instruction from the user.

Until the user confirms that the voice information of the voice navigation device is correct, the voice navigation device begins to perform the specific operation (i.e., setting a destination and initiating route navigation to the destination).

In the above voice navigation method of the present disclosure, the voice navigation can be accurately and smoothly performed even in the case where the voice information is recognized incorrectly by introducing a confirmation mechanism for the voice information, without causing deviation in the navigation setting process and wasting the efforts made by the navigation setting operations that had been performed previously.

Figure 5:
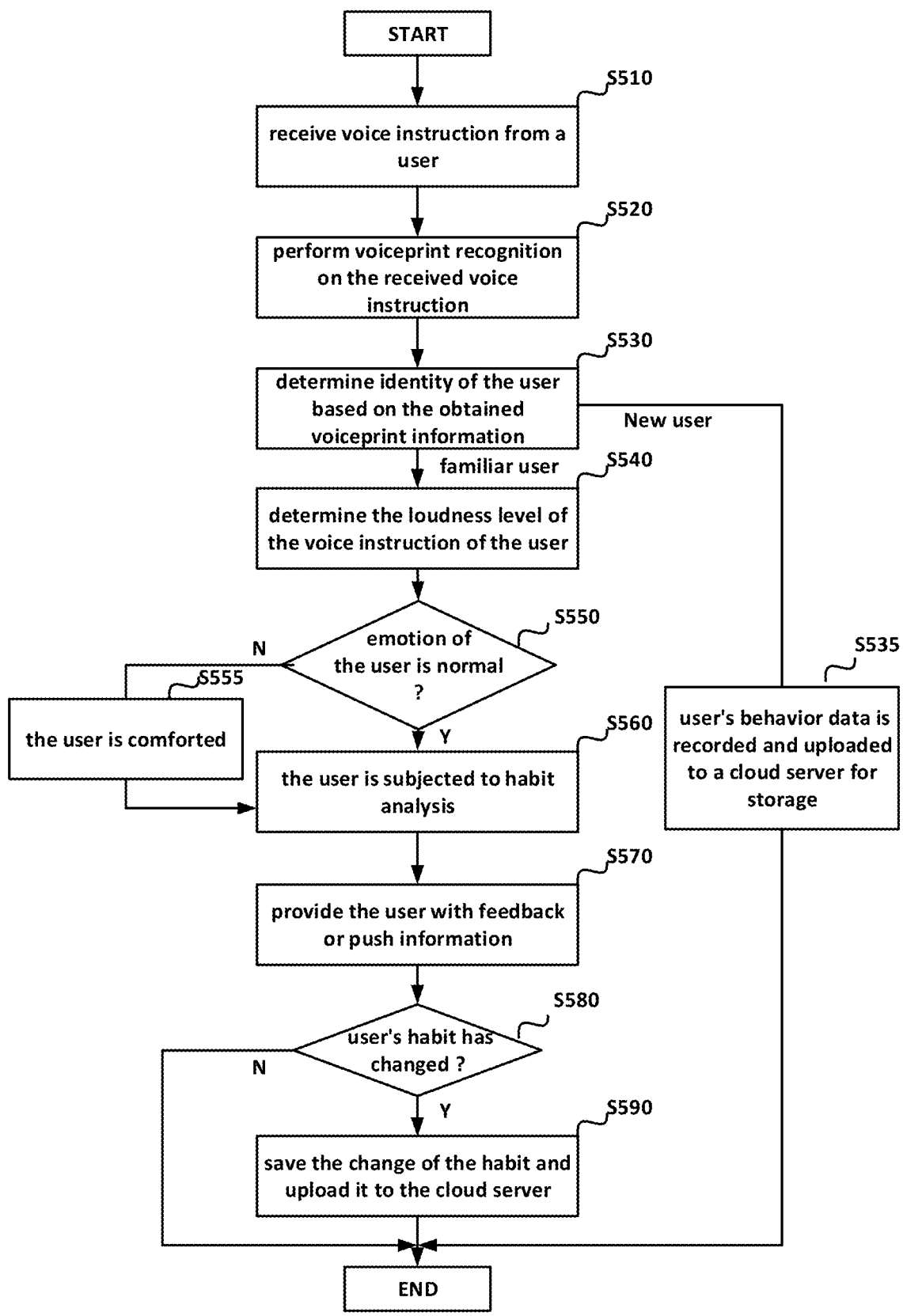
FIG. 5 is a schematic diagram illustrating an interaction according to an embodiment of the present disclosure.

FIG. 5 is a schematic diagram illustrating an interaction according to an embodiment of the present disclosure. The interaction may be implemented, for example, as an interaction between the user and the voice navigation device 110 shown above.

As shown in FIG. 5, the interaction begins in step S510, in which the voice navigation device receives a voice instruction from a user. The voice instruction may be any voice of the user, such as "Please play music."

Then, in step S520, the voice navigation device performs voiceprint recognition on the received voice instruction to obtain voiceprint information.

Next, in step S530, the voice navigation device determines the identity of the user based on the obtained voiceprint information. For example, the voice navigation device can determine whether the user is a new user or a familiar user by using the voiceprint information of the voice instruction.

When the user is a new user, the interaction proceeds to step S535, in which the user's behavior data is recorded and the recorded data is stored locally or uploaded to a cloud server for storage. In addition, a habit model can be created for the new user locally or on the cloud server. After that, the interaction process ends.

When the user is a familiar user, the interaction proceeds to step S540, where the loudness level of the user's voice instruction is determined.

After determining the loudness level of the voice instruction, in step S550, the voice navigation device determines whether the current emotion of the user is normal based the loudness level of the voice instruction of the user. Specifically, the voice navigation device may consider that the current emotion of the user is abnormal when the loudness level of the voice instruction is too high or too low. As another example, the voice navigation device can assume that the current emotion of the user is normal when the loudness level of the voice instruction is within a certain range.

When it is determined in step S550 that the user's emotion is normal, the process go to step S560 in which the user is subjected to a habit analysis. The habit analysis may be performed based on the user's voice instruction, or may be performed by determining a state of the voice navigation device or based on an operation of the device by the user. For example, when the voice navigation device receives the user's voice "Please play music", the voice navigation device learns the meaning of the voice through language processing, and determines that the user wants to hear the music that he likes, and thus performs a habit analysis with respect to music by using the habit model. The result of the habit analysis may be, for example, a list of music that the user plays the most.

When it is determined in step S550 that the user's emotion is abnormal, the process goes to step S555 in which the user is comforted by voice or music. For example, if the loudness level of the voice instruction is too high, the user's current emotion may be considered to be angry which belongs to an abnormal state. At this point, the voice navigation device can play soothing music to comfort the user. Then, the process goes to step S560.

After the habit analysis, the voice navigation device provides the user with feedback information or push information in step S570. For example, in the above example, the voice navigation device may add an item in the determined music list to the current playlist and start playing the corresponding audio.

In the process of playing music, the voice navigation device may continuously provide the music playing information to the habit model, so that the next time the habit model is used for the habit analysis, it will be based on the latest data.

Further, during the play, the user may set a certain song as the favorite music, and thus in step S580, it is possible to detect that the user's habit has changed. Therefore, the voice navigation device saves the change of the habit in step S590 and uploads it to the cloud server so that the habit model can be updated on an immediate or regular basis. After the update, the interaction process ends.

If it is not detected in step S580 that the user's habit has changed, the interaction process ends.

The present disclosure also provides a computer readable storage medium. Executable instructions are stored on the computer readable storage medium. The instructions, when executed by a processor, cause the processor to perform the voice navigation method in accordance with the above embodiments.

The computer readable storage medium provided by the present disclosure may be, for example, but not limited to, an electronic, magnetic, optical, electromagnetic, infrared, or semiconductor system, apparatus, or device, or any combination of the above. More specific examples of computer readable storage medium may include, but are not limited to, electrical connections having one or more wires, portable computer disks, hard disks, random access memory (RAM), read only memory (ROM), erasable Programmable read only memory (EPROM or flash memory), optical fiber, portable compact disk read only memory (CD-ROM), optical storage device, magnetic storage device, or any suitable combination of the foregoing. In the present disclosure, a computer readable storage medium may be any tangible medium that can contain or store a program or instructions, which can be used by or in connection with an instruction execution system, apparatus or device.

The present disclosure also provides a computer device. The computer device includes a memory (e.g., a computer readable storage medium as described above), a processor, and a computer program stored on the memory and executable by the processor (e.g., executable instructions on a computer readable storage medium, as described above). The computer program, when executed by the processor, causes the processor to perform the voice navigation method in accordance with the above embodiments.

Figure 6:
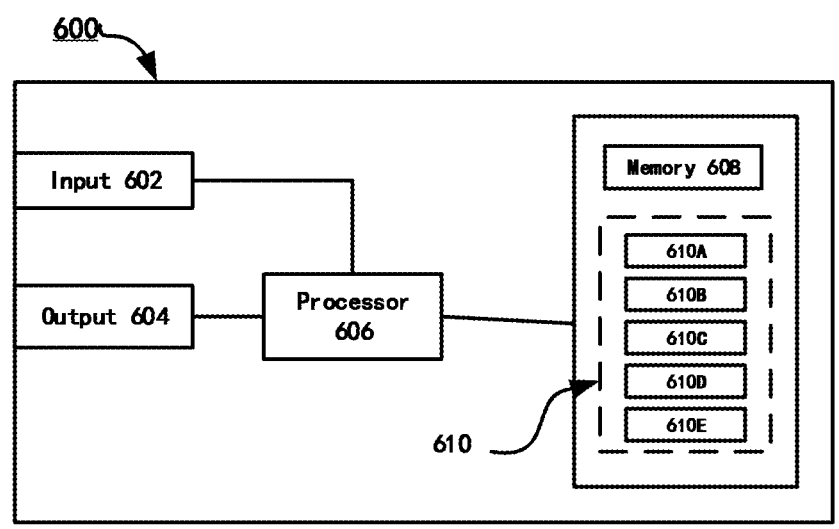
FIG. 6 illustrates an example of a computer device according to an embodiment of the present disclosure.

FIG. 6 illustrates an example of a computer device 600 according to an embodiment of the present disclosure. As shown in FIG. 6, the computer device 600 includes an input unit 602, an output unit 604, a processor 606, and a memory 608. Therein, the memory 608 stores computer programs 610, which may include, for example, executable instructions 610A to 610E.

The input unit 602 and the output unit 604 are respectively configured to receive an input signal and transmit an output signal. The processor 606 may process the computer program 610 stored on the memory 608 in order to perform a voice navigation method in accordance with various embodiments of the present disclosure.

According to an embodiment of the present disclosure, the processor 606 may execute a computer program 610 to perform voice processing on the received voice instructions so as to obtain voice information, send a request to confirm voice information to the user, receive a response to the request from the user, and perform the specific operation if the response confirms that the voice information is correct.

According to an embodiment of the present disclosure, the processor 606 may execute the computer program 610 to enter an instruction receiving state to receive another voice instruction of the user for the specific operation if the response confirms that the voice information is incorrect.

The request and the response may be implemented through the input unit 602 and the output unit 604, respectively. For example, the input unit 602 may be a keyboard, a touch screen, a microphone, etc., and the output unit 604 may be a display screen, a speaker, or the like.

According to an embodiment of the present disclosure, the processor 606 can execute the computer program 610 to take the response as another voice instruction for the specific operation if the response does not confirm that the voice information is correct.

According to an embodiment of the present disclosure, the processor 606 may execute the computer program 610 to acquire voiceprint information of the voice instruction to determine the identity of the user, determine a user-specific instruction set according to the identity of the user, and perform voice processing on the voice instruction by using the user-specific instruction set.

According to an embodiment of the present disclosure, the processor 606 may execute the computer program 610 to determine a loudness level of the voice instruction, determine a reference loudness level for the user based on the identity of the user, and determines an emotional state of the user by comparing the determined loudness level with the reference loudness level.

According to an embodiment of the present disclosure, the processor 606 may execute the computer program 610 to determine a user habit model based on the identity of the user, perform a behavior analysis using the user habit model, and provide the user with push information based on the result of the behavior analysis.

The computer device is also configured to acquire external information, wherein the external information includes time information, location information, or speed information. The processor 606 may execute the computer program 610 to perform a behavior analysis based on the external information.

According to an embodiment of the present disclosure, the user habit model is stored, trained, and/or updated in a cloud server.

According to an embodiment of the present disclosure, the processor 606 may execute the computer program 610 to determine whether the voice instruction matches a voice instruction for another operation based on the determined voice information, and if they are matched, perform the other operation instead of the specific operation.

Although the present disclosure has been described with reference to a few exemplary embodiments, it is understood that the terms used are illustrative and exemplary and not restrictive. The present disclosure may be embodied in a variety of forms without departing from the spirit or scope of the disclosure, and it is to be understood that the above-described embodiments are not limited to the details described and shall be construed broadly in the spirits and scope defined by the appended claims. All changes and modifications that fall within the scope of the claims or the equivalents thereof are intended to be covered by the appended claims.

The invention claimed is:

1. A voice control method, comprising:
receiving, in an instruction receiving state, a voice instruction of a user for a specific operation;
performing voice processing on the voice instruction to obtain voice information;
transmitting, to the user, a request to confirm the voice information;
receiving, from the user, a response to the request;
performing the specific operation if the response confirms that the voice information is correct;
acquiring voiceprint information of the voice instruction to determine an identity of the user;
acquiring a loudness level of the voice instruction;
determining a reference loudness level for the user based on the identity of the user; and
determining an emotional state of the user by comparing the acquired loudness level to the reference loudness level;
wherein the step of performing voice processing on the voice instruction to obtain voice information further comprises:
determining a user-specific instruction set based upon the identity of the user; and
performing voice processing on the voice instruction based on the user-specific instruction set.

2. The method according to claim 1, wherein the request and the response are implemented by means of voice.

3. The method according to claim 1, further comprising:
taking the response as another voice instruction for the specific operation if the response does not confirm that the voice information is correct.

4. The method according to claim 1, further comprising:
determining a user habit model based on the identity of the user;
performing a behavior analysis using the user habit model; and providing the user with feedback information based on the result of the behavior analysis.

5. The method according to claim 4, further comprising:
acquiring external information, wherein the external information includes time information, location information, and/or speed information; and
wherein the step of performing the behavior analysis further comprises performing the behavior analysis based on the external information.

6. The method according to claim 1, further comprising:
determining, based upon the determined voice information, whether the voice instruction matches a voice instruction for a different operation; and
performing the different operation instead of the specific operation if there is a match.

7. A voice control device, comprising:
a sound receiving unit configured to receive a voice instruction of a user for a specific operation;
a sound transmitting unit configured to transmit a voice to the user;
a storage having stored thereon computer programs; and
a processor configured to execute the computer programs to:
perform voice processing on the received voice instruction to obtain voice information;
transmit, to the user, a request to confirm the voice information;
receive, from the user, a response to the request;
perform the specific operation if the response confirms that the voice information is correct;
acquire voiceprint information of the voice instruction to determine an identity of the user;
determine a user-specific instruction set based upon the identity of the user; and
perform voice processing on the voice instruction based on the user-specific instruction set;
determine a loudness level of the voice instruction;
determine a reference loudness level for the user based on the identity of the user; and
determine an emotional state of the user by comparing the determined loudness level to the reference loudness level.

8. The device according to claim 7, wherein the request and the response are implemented by means of the sound receiving unit and the sound transmitting unit, respectively.

9. The device according to claim 8, wherein the processor is further configured to execute the computer programs to:
take the response as another voice instruction for the specific operation if the response does not confirm that the voice information is correct.

10. The device according to claim 7, wherein the processor is further configured to execute the computer programs to:
determine a user habit model based on the identity of the user;
perform a behavior analysis using the user habit model; and
provide the user with push information based on the result of the behavior analysis.

11. The device according to claim 10, wherein the device is further configured to acquire external information, the external information including time information, location information, and/or speed information; and
wherein the processor is further configured to execute the computer programs to perform the behavior analysis based on the external information.

12. The device according to claim 10, wherein the user habit model is stored, trained, and/or updated in a cloud server.

13. The device according to claim 7, wherein the processor is further configured to execute the computer programs to:
- determine, based upon the determined voice information, whether the voice instruction matches a voice instruction for a different operation; and
- perform the different operation instead of the specific operation if there is a match.

14. A non-transitory computer readable storage medium having stored thereon executable instructions which, when executed by a processor, cause the processor to carry out the method according to claim 1.

15. The method according to claim 1, further comprising:
- entering into the instruction receiving state to receive another voice instruction of the user for the specific operation if the response confirms that the voice information is incorrect.

16. The device according to claim 7, wherein the processor is further configured to execute the computer programs to:
- enter into an instruction receiving state to receive another voice instruction of the user for the specific operation if the response confirms that the voice information is incorrect.

* * * * *